Dec. 2, 1930.                J. B. ZIMMERS                1,783,896
                           DRIP AND TRIM MOLDING
                           Filed April 20, 1925
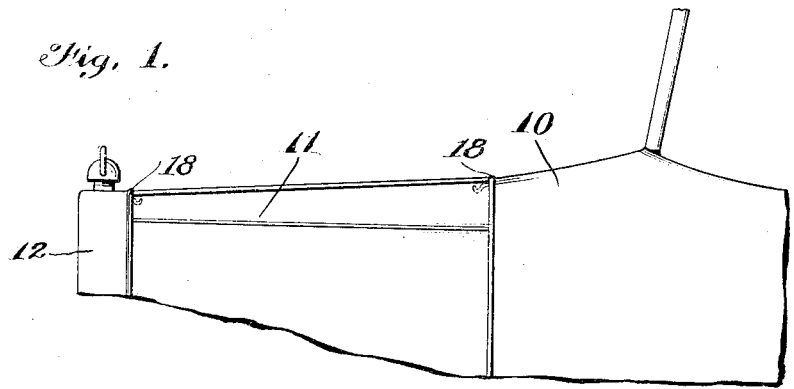
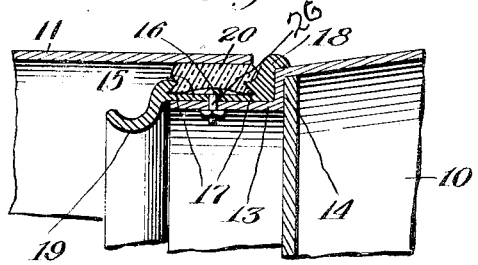
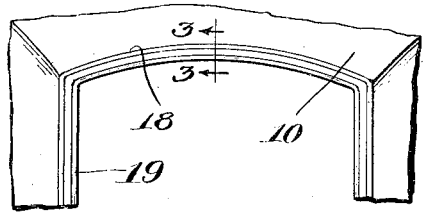
Inventor
Joseph B. Zimmers.
By Winfield Williams
Attys.

Patented Dec. 2, 1930

1,783,896

UNITED STATES PATENT OFFICE

JOSEPH B. ZIMMERS, OF CHICAGO, ILLINOIS

DRIP AND TRIM MOLDING

Application filed April 20, 1925. Serial No. 24,650.

My invention pertains to finishing molding for automobiles specifically, and generally for a trim or finishing device where a noiseless and somewhat resilient bearing is applicable between two metallic members.

My primary objects are to provide a protection against storm beating into the machinery, and provide a noiseless demountable bearing for the hood of a motor vehicle. Other objects will appear.

The present application is an improvement upon my device as disclosed in my former U. S. Letters Patent #1,448,986, dated March 20, 1923.

In this application I have more direct reference to a drip and trim molding for use upon a motor vehicle in connection with the hood in its association with the radiator and the body of the vehicle and is intended to provide a cushioning effect between the parts and present a noiseless bearing surface.

The accompanying drawing illustrates a form of my invention in which Fig. 1 is a broken section of a motor vehicle showing a portion of the hood removed and the device indicated therein. Fig. 2 is a front view of the cowl where it contacts with the hood. Fig. 3 is a cross section—in enlarged form—of Fig. 2 at the arrows 3—3. A similar view would illustrate the radiator side. Fig. 4 is a cross section of a non-ferrous sound proof insert, and Fig. 5 is a longitudinal view of the same. Fig. 6 is a modification of the device wherein the channel strip is integral with the body of the vehicle, or the body of the radiator, instead of being an attached device.

As illustrated I will best explain it as applied to the commonly known type of automobile, in which a ledge or shelf 13 forms part of the body 10 of an automobile and a similar ledge or shelf is formed upon the radiator 12. A hood member 11 has portions which can be raised or lowered to have access to the machinery and to cover it when in service: the said hood 11 has opposing ends resting upon the body of the vehicle and upon the radiator. The movements of the vehicle have a tendency to cause a twisting and torsion of the various parts and the frictional contact of the parts tends to produce noises and difficulties against which it is necessary to provide, and against wear. It is further known that, under the general method, there is a constant tendency of water to seep in or be driven in, under the edges of the hood and come into contact with the machinery covered by the hood, and affect its proper operation. I provide a channel 16 having inclined walls 17 with a restricted opening: one of these walls being formed into a bead 18, intended to form a finishing member between the hood and the body of the vehicle; the other wall having projected therefrom a depending trough 19 adapted to catch and carry away from the machinery excess of moisture which may find its way under the edge of the hood.

I provide a member 20 of some non-ferrous material, having flange extensions 21 adapted to be inserted in the channel 17 and held therein by the coaction of the flanges 21 with the channel walls 17: the said member 20 is provided with a substantially flat top and an overhang at either side thereof, so that when any pressure comes upon the surface 22 the overhanging portions expand over the edges of the restricted openings 17.

In Fig. 6, I show a modification of my device wherein the channel formation 13 with its walls 17 and a bead 23 are formed out of the material 10 of the body of the vehicle: the bead 23 being similar to the bead 18 in Fig. 3. This formation may be extended in the form of a drip—like 19 in Fig. 3.

The description of parts applies equally to the radiator side of the hood. In the primary form I show a means of attachment 26, which may consist of a bolt, rivet, or any other desirable means; and such an arrangement of the base of the member 20 as may be convenient for covering said attachment. I do not limit myself to the structure as shown excepting in so far as it may be limited by my claims.

I claim:

1. The combination with an automobile of a molding consisting of a channel strip with edges forming a restricted entrance opening, means spaced within the channel enclosure for attaching the molding to a body: one of the edges forming a bead, the other edge formed into a depending drip trough; a non-ferrous removable insert having flange means for insertion in the channel and adapted to be held therein by the coaction of the said flanges with the inner walls of the channel.

2. In a device for the purposes described a metal strip having a central body formed up as a channel with inwardly turned sides, their edges forming a restricted entrance opening; one of said upstanding sides being formed into a finishing bead, the opposite channel side being formed into a drip trough; attaching means distributed throughout the channel base; a non-sound conducting material formed with a pair of opposing legs or flanges adapted to be inserted in the said channel and be securely held therein by the coaction of the said legs with the inner surface of the walls of the channel, said insert having a surface above the channel opening adapted to form a bearing surface for a metal covering.

3. In a device of the character described an elongated metal strip having a central body formed up into a channel with inwardly inclined walls, the edges of said walls forming a restricted entrance opening; a non-sound conducting member having a portion of its body of slightly greater width than the width of the metal channel opening, said portion of the body being shaped to substantially correspond to the shape of the inside of said channel and adapted to be inserted in said channel and cover a channel attaching means; said non-sound conducting member having a body portion extending above the edge walls of said channel and having a surface adapted to form a non-sound conducting surface; the metal channel member having one of its walls formed to provide a finishing bead, the reverse wall portion supporting a depending gutter portion: attaching means distributed throughout the base of the channel portion.

4. In combination with an automobile a cushioning device for end supports of the hood means for covering the engine consisting of a channeled portion extending along the said end supports, said channel portions having a restricted entrance opening adapted to receive and retain therein a resilient member; a resilient member having a formation adapted to be inserted in the channel through the restricted entrance opening and be held therein by the coaction of the resilient member with the inside walls of the channel, the said resilient member having a surface extending above the entrance opening of the channel.

5. In combination with a hood and cowl of an automobile, a hood-supporting molding secured to the front of the cowl and having an outwardly projecting curved bead terminating in a face which engages the cowl slightly rearwardly of the front face.

6. In combination with a hood and cowl of an automobile, a hood-supporting molding secured to the front of the cowl and having an outwardly projecting curved bead terminating in a face which engages the cowl slightly rearwardly of the front face, and having also a hood-supporting forward extension provided with a groove to receive a hood-engaging facing strip.

Signed at Chicago, Illinois, April 16th, 1925.

JOSEPH B. ZIMMERS.